(12) United States Patent
Klein (10) Patent No.: US 11,137,304 B2
(45) Date of Patent: *Oct. 5, 2021

(54) LASER ULTRASONIC FASTENER LOAD MEASUREMENT PROBE

(71) Applicant: Optech Ventures LLC, Torrance, CA (US)

(72) Inventor: Marvin Klein, Torrance, CA (US)

(73) Assignee: Intelligent Optical Systems, Inc., Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/734,299

(22) Filed: Jan. 4, 2020

(65) Prior Publication Data

US 2020/0141826 A1  May 7, 2020

Related U.S. Application Data

(63) Continuation-in-part of application No. 16/364,941, filed on Mar. 26, 2019, now Pat. No. 10,527,510, which is a continuation of application No. 15/594,042, filed on May 12, 2017, now Pat. No. 10,345,173.

(60) Provisional application No. 62/350,251, filed on Jun. 15, 2016.

(51) Int. Cl.
 *G01L 5/00* (2006.01)
 *G01L 5/24* (2006.01)
 *G01L 1/25* (2006.01)

(52) U.S. Cl.
 CPC ............. *G01L 5/246* (2013.01); *G01L 1/255* (2013.01)

(58) Field of Classification Search
 CPC ............ G01L 5/246; G01L 1/255; G01L 1/25
 See application file for complete search history.

(56) References Cited

U.S. PATENT DOCUMENTS

| | | | | |
|---|---|---|---|---|
| 4,899,591 A | * | 2/1990 | Kibblewhite | ....... B25B 23/1425 29/594 |
| 5,131,276 A | * | 7/1992 | Kibblewhite | ......... B06B 1/0662 29/595 |
| 5,220,839 A | * | 6/1993 | Kibblewhite | ......... B06B 1/0662 73/761 |
| 5,675,087 A | * | 10/1997 | MacLauchlan | ........... G01L 1/25 73/597 |

(Continued)

*Primary Examiner* — Jamel E Williams
(74) *Attorney, Agent, or Firm* — Brian Billett (57) ABSTRACT

A system, probe and method accurately measure the strain or extension of a fastener that occurs as a nut on the fastener is tightened and the fastener is put under load. The measurement technique is based on measurement of the time for an ultrasonic wave generated on one end of the fastener to travel a round trip through the fastener. As the fastener is tightened, the applied stress causes an associated increase in length. This length can be determined from a measurement of the increase in transit time. In various embodiments, the disclosed device and method uses laser ultrasonic testing (LUT), in which a pulsed laser generates the ultrasonic wave and a type of laser vibrometer detects the wave when it returns to the position of generation following a combination of longitudinal and shear wave reflections, which result in a higher magnitude and more easily and precisely measurable reflected signal peak than a signal peak associated with a signal directly reflected against the opposite end of the fastener.

21 Claims, 7 Drawing Sheets

(56) References Cited

U.S. PATENT DOCUMENTS

| | | | | | |
|---|---|---|---|---|---|
| 5,970,798 | A | * | 10/1999 | Gleman | G01L 5/246 73/761 |
| 6,354,152 | B1 | * | 3/2002 | Herlik | G01N 29/223 73/597 |
| 7,407,354 | B2 | * | 8/2008 | Rau, III | B60B 23/10 411/383 |
| 7,628,079 | B2 | * | 12/2009 | Sato | G01L 5/24 73/761 |
| 8,683,869 | B2 | * | 4/2014 | Herley | F16B 31/02 73/761 |
| 8,723,673 | B2 | * | 5/2014 | Meiksin | G01H 1/003 340/566 |
| 8,810,370 | B2 | * | 8/2014 | Tillotson | H04Q 9/00 340/10.1 |
| 8,978,967 | B2 | * | 3/2015 | Gamboa | B25B 13/00 235/375 |
| 9,638,600 | B2 | * | 5/2017 | Haywood | G01L 19/0069 |
| 9,746,017 | B2 | * | 8/2017 | Ota | G01C 19/56 |
| 2017/0363491 | A1 | * | 12/2017 | Klein | G01L 1/255 |
| 2020/0141826 | A1 | * | 5/2020 | Klein | G01L 5/246 |

* cited by examiner

LASER ULTRASONIC FASTENER LOAD MEASUREMENT PROBE

RELATED APPLICATIONS

This application claims the benefit of and is a continuation-in-part of non-provisional U.S. patent application Ser. No. 16/364,941 filed on Mar. 26, 2019, which was a continuation of non-provisional application Ser. No. 15/594,042, filed on May 12, 2017. This application for patent claims the benefit of provisional application 62/350,251, filed on Jun. 15, 2016 for the common subject matter contained therein. The present application incorporates by reference the above applications herein in their entirety.

FIELD OF THE INVENTION

This field of this disclosure relates generally to measuring fastener load.

BACKGROUND

Measuring the load on a fastener during installation of the fastener is a long standing problem. As a general problem, the fastener load value should be optimized depending on the fastener, assembly materials and application. During a typical application, when a fastener is put into use, it is inserted into clearance holes in a multi-part assembly. A washer and nut are lightly threaded onto the end by hand. Tightening the fastener requires two people: one person fixing the head with a standard wrench and another person on the opposite side of the structure tightening the nut with a torque wrench. The nut is tightened to a specified level of torque. In this example, the torque wrench measures torque as a proxy for bolt load. This technique suffers from inaccuracy due to inconsistent or uncalibrated friction between the fastener and its mating hole. The torque applied must overcome the contact friction as well as loading the fastener. In alternative fastener installations, one end of the fastener or bolt may be integrated into the assembly directly, however, a torque wrench measurement still suffers the same shortcomings.

For assembly in critical areas, instrumented fasteners may be used. Instrumented fasteners have a transducer bonded to the head of the fastener. In typical applications, this transducer allows an ultrasonic measurement of the fastener extension, using a commercially available instrument for ultrasonic fastener load measurement. In available commercial ultrasonic instruments, ultrasonic vibration is induced mechanically at the transducer end of the fastener. In a typical use, the instrument then measures the arrival time of the induced wave that travels the length of the fastener, reflects from the opposite face and returns to the starting point. As the fastener is tightened to apply tensional stress, the fastener is put under positive strain and increases in length. At the same time, the sound velocity decreases through the acousto-elastic effect. An ultrasonic pulse propagating through a loaded fastener thus propagates a greater distance at a slower velocity than in an unloaded fastener, producing a time delay that can be used to determine the internal stress in the shank of the fastener.

In a maintenance or service environment it is desirable to measure the current load. However, there is no measurement reference point at zero load, so the transducer approach cannot be used. The use of applied torque for load measurement suffers from the same limitations described earlier.

Current commercial devices which perform transducer-based measurement of fastener extension have several problems including difficult, complex and cumbersome use due in part to the transducer-contact interface, cost, a limitation of the accuracy of the device and that the measurements were available in real time.

SUMMARY

In the present disclosure, embodiments including a system, device and methods are disclosed for accurately measuring the load on a fastener that occurs as the nut on the fastener is tightened. The measurement technique is based on measurement of the time for an ultrasonic wave generated on one end of the fastener to travel a round trip through the fastener. As the fastener is tightened to apply tensional stress, the fastener is put under positive strain and increases in length. At the same time, the sound velocity decreases through the acousto-elastic effect. An ultrasonic pulse propagating through a loaded fastener thus propagates a greater distance at a slower velocity than in an unloaded fastener, producing a time delay that can be used to determine the internal stress or load in the shank of the fastener. In order to determine the load from the change in arrival times, a model must first be developed that takes into account a number of factors including the length and diameter of the fastener, the placement of the threads, the longitudinal and shear velocity, the change in these velocities as a function of load, the fastener temperature and the velocities at this temperature and the internal path of the waves. As the load varies linearly with the change in arrival time, all the other factors can be used to calculate a slope, so the load can be determined by multiplying the slope by the change in arrival time.

In alternative embodiments where the fastener load needs to be measured in place without the benefit of measured reference signal, the user may be able to look up a previously recorded reference signal for the specific fastener. If this data is unavailable, then a combination of at least three measured signals may be used to determine load.

In various embodiments, the disclosed device and method uses laser ultrasonic testing (LUT), in which a pulsed laser generates the ultrasonic wave and a type of laser vibrometer detects the wave when it returns to the position of generation. Disclosed unexpected experimental results of ultrasonic reflected signal detection are incorporated into the probe detection of fastener load for increased measurement accuracy and reliability.

In various embodiments, disclosed is a compact, fiber optic probe that delivers both laser beams (generation and detection) to the end surface of the fastener. In an embodiment disclosed, the probe has an adapter at its end that allows it to be threaded directly to the end of the fastener. Various embodiments include adapters designed for fasteners of different diameter and thread pitch. In various embodiments, the small size of the probe allows rapid mounting and dismounting and provides for eye safety by completely encapsulating the end face of the fastener.

In various embodiments, the probe optical components overlap the two laser beams and focus them on the end surface of the fastener. The optical design of the probe is precise enough that no internal alignment is required. In order to maintain focus, the probe is seated into a designed standoff position after threading onto the fastener.

In various embodiments, the laser ultrasonic bandwidth available for probe generated and detected signals range to at least 125 MHz, providing a very accurate measurement of transit time and thus fastener extension. In various embodiments, the disclosed probe signal bandwidth provides a substantial increase in accuracy over current transducer-based fastener load measuring devices due to the higher available bandwidth.

DETAILED DESCRIPTION

In various embodiments a single round trip ultrasonic signal is generated and detected at one end of a fastener. Single reflected signals are generated and detected before (unloaded) and after loading (loaded) the fastener. Both loaded and unloaded signals make a single round trip by propagating the length of a fastener. Load is determined by a cross-correlation of identified signal peaks in the acquired signals. In contrast to conventional ultrasonic transducer probes, in various embodiments, only optical beams contact the end of the fastener, and the vibration is induced in a small centrally located spot rather than the larger area occupied by a transducer. As explained below, these differences in ultrasonic signal generation produce significantly different temporal signal characteristics. In various embodiments, the signal peak utilized to determine signal arrival time differences is not the expected direct round trip signal along the axis of the fastener, but one which has reflected multiple times off the fastener walls and converted at least once from a longitudinal to a shear wave that transits laterally across the fastener and then converts back to a longitudinal wave.

In conventional fastener ultrasonic measurement systems, when a transducer is used to measure bolt extension, a 0° longitudinal wave transducer is selected. This conventional mechanical transducer generates a longitudinal wave that travels along the normal to the end surface, i.e. along the axis of the fastener. This wave reflects from the opposite surface (at the opposite end of the fastener) and returns to the point of generation, where it is detected. In this conventional ultrasonic transducer measurement, the path of the wave is simple and intuitive: it follows the central axis of the fastener.

In contrast to transducer-based systems, in various embodiments of the present system, when generating ultrasonic waves in metals with a pulsed laser, there are two generation regimes: thermoelastic at low pulse energy and ablative at higher laser energy. The ablative regime is chosen for this application, as the longitudinal waves have much higher amplitude. In addition, it is known that laser-generated longitudinal waves in the ablative regime are nearly omnidirectional: they are strongest along the normal to the surface, but the wave amplitude drops only gradually at larger angles to the surface normal. The broad angular range of the generated waves leads to an unexpected result: the strongest return signals correspond to waves that reflect several times on the sides of the fastener, while the direct axial signal is relatively weak. It is known that the strong signals correspond to reflected waves, as their arrival times are longer than the arrival time for the direct axial wave. A longer arrival time means a longer path length. In various embodiments, by measuring the arrival times of the largest signals, determining the path followed by the waves is possible. The strongest signals correspond to longitudinal waves that are generated off axis and that mode convert to a shear wave at the wall that traverses the fastener and mode converts back to a longitudinal wave.

By way of explanation for these observed signal characteristics which are utilized in the implementation of various embodiments, one may consider a cause for the relative strength of off-axis waves. If the waves are looked upon as rays, then only one ray travels straight down the axis and back, while many rays (in the shape of a hollow cone) travel at a given angle to the axis. The cylindrical shape of the fastener captures all these off-axis rays and bundles them together each time they pass through the axis of the fastener. Thus, off axis rays give a stronger signal in a cylinder than the single ray traveling down the axis.

Figure 1:
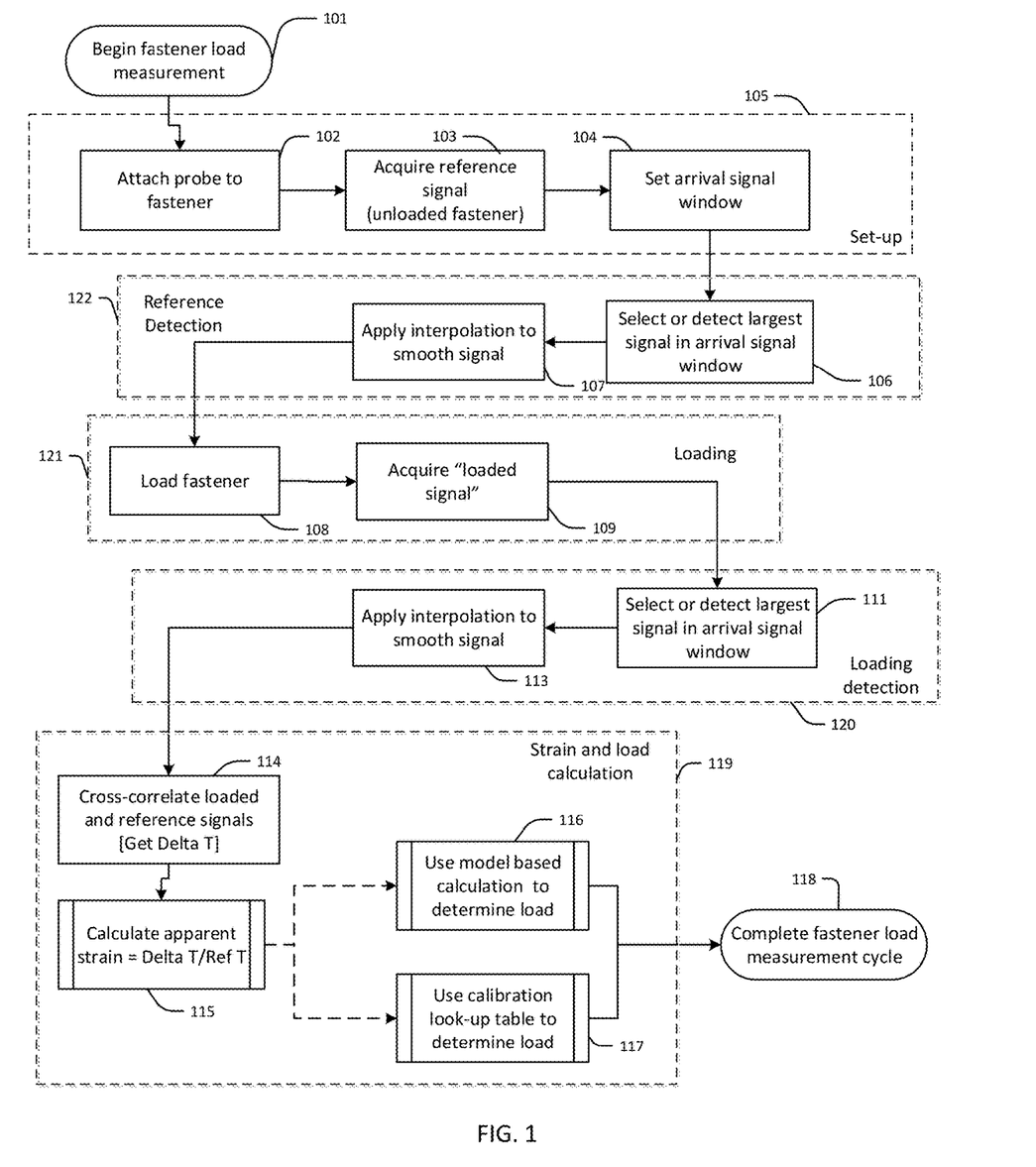
FIG. 1 shows a flow chart which outlines an embodiment methodology for laser ultrasonic measurement of fastener loading.

Shown in FIG. 1 is a flow chart outlining an exemplar methodology for various embodiments for measuring fastener head loading 101. Various aspects and components of the method and apparatus are detailed further below and in the other drawings. The process begins by attaching the probe shown in FIGS. 3A-3C 301 to a fastener used in an assembly. As explained below, in various embodiments, the probe is designed to be attached to the fastener 102 after installation of a nut or loading component. Prior to loading the fastener, a reference signal is generated and recorded 103. In various embodiments, a temporal window is selected either automatically or manually from the acquired reference signal 104. In various embodiments, following the set-up phase 105, the reference signal detection is performed 122. In this phase, the highest peak in the arrival window is selected either manually or automatically 106 and the identified signal peak is smoothed by interpolation 107. During the loading phase 121, as the fastener is loaded 108, the probe generates and detects (or acquires) an ultrasonic signal 109. As with the reference signal, during the loading detection phase 120 the largest signal peak is selected manually or automatically 111. In the last phase, the strain and load calculation 119, the selected and interpolated reference and loaded signals are cross-correlated 114 to obtain the time difference [delta T]. Then the methodology may optionally either use a finite element based model 116 to compute the load or a calibrated look-up table based on empirical data 117 to compute the measured load, completing one cycle of measurement 118. The calibrated look-up table or model-based methodology incorporates correction of (1) the axial variation of the internal strain and stress of the fastener, (2) change in (shear and longitudinal) wave velocity with stress or load, (3) variation of wave velocity with temperature and (5) the non-axial propagation of waves in the fastener as exhibited in various embodiments disclosed herein.

Figure 2:
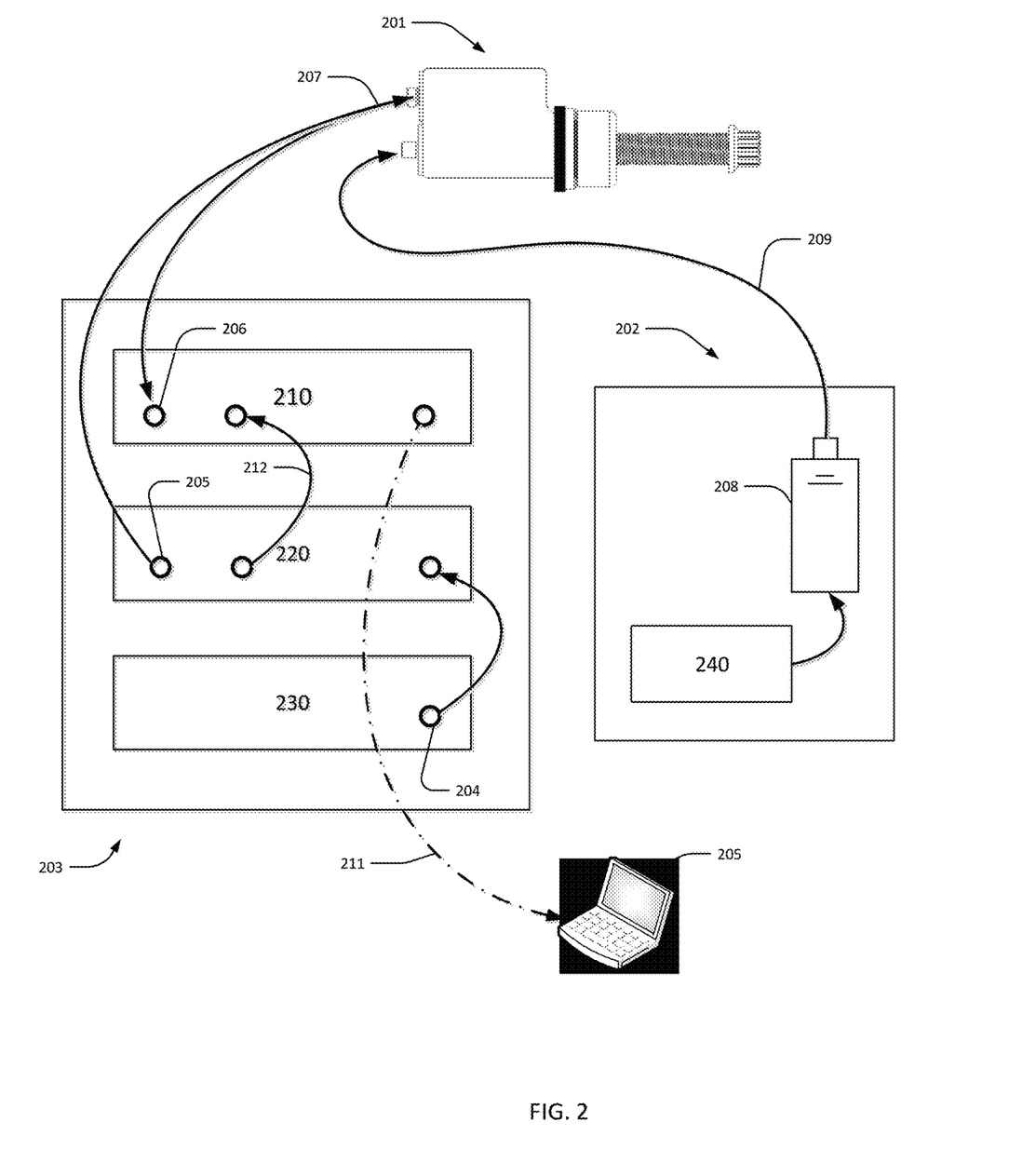
FIG. 2 shows an exemplar embodiment of the laser probe and associated measurement system components.

FIG. 2 is a component diagram for various embodiment of the measurement system utilizing the laser ultrasonic probe 201. The system components in various embodiments are generally divided between the probe 201, the laser ultrasonic generation components 202, the laser ultrasonic detection components 203, and the acquired signal digitizer and computer control component 205. In various embodiments, a control system 240 is utilized to operate the ultrasonic signal generation by controlling a pulsed Nd:YAG laser 208, which propagates the ablating laser pulses through the generation optical fiber 209 to the probe 201.

In various embodiments, the returning ultrasonic waves are detected using a detection laser 230, which sends the detection laser beam 204 to a variable fiber splitter 220 which splits the laser input between a reference beam 212 and detection beam 205. A receiver component 210 receives the signal back 206 from the probe 201 and converts the signal for output 211 for the digitizer.

Figure 3A:
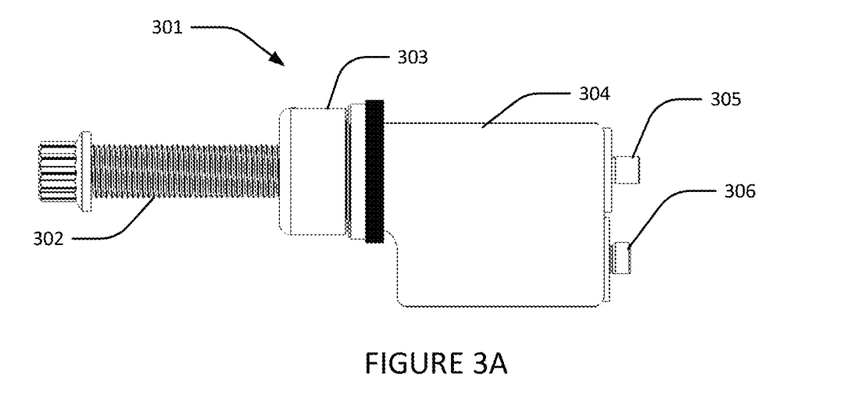
FIG. 3A shows a side view of an exemplar probe embodiment with a fastener attached.
Figure 3B:
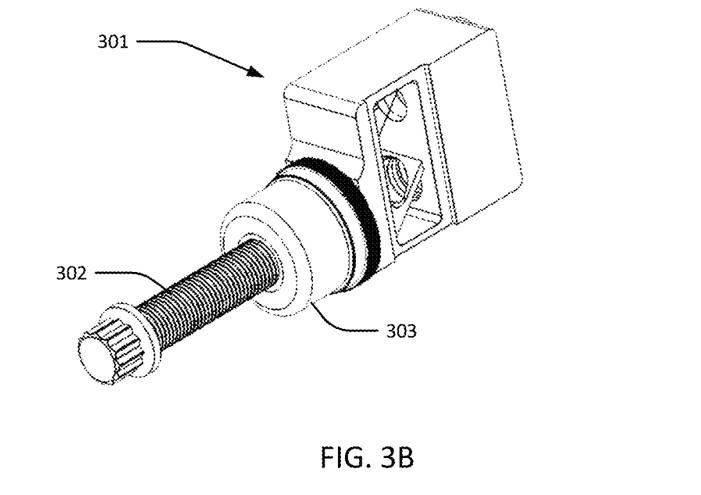
FIG. 3B shows a perspective view of an exemplar probe embodiment with a fastener attached.
Figure 3C:
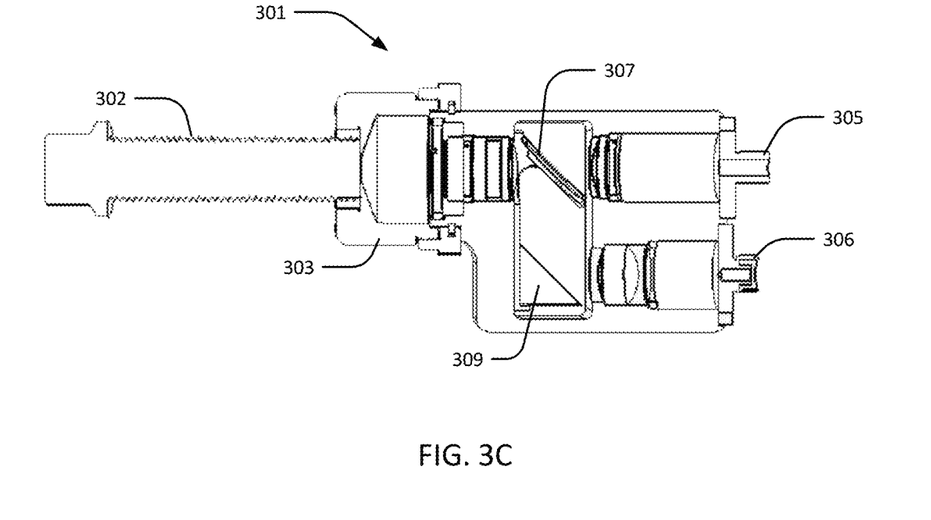
FIG. 3C shows a side cross section view of an exemplar probe embodiment with a fastener attached.

FIGS. 3A-3C show various views of an embodiment of the laser ultrasonic fastener probe 301. In FIG. 3A, the probe is shown in its case 304 from a side view. The probe case 304 is affixed to the fastener 302 with the probe collar 303 which is threaded onto the end of the fastener. Also shown are the connectors for the laser generation fiber 305 and laser detection fiber 306. FIG. 3B shows a perspective view of the probe 301 with a fastener 302 affixed to the probe by the probe collar 303. The probe collar is designed to thread onto the fastener without rotating the fastener or the probe. The diameter of the probe collar is designed to be large enough that internally-reflected shock waves from the ablation process arrive sufficiently late in time to avoid disturbing the desired signals.

FIG. 3C shows a side cross-sectional view of the probe 301 with an affixed fastener 302. The probe collar 303 is shown seated against the fastener end, demonstrating how the design provides a rapid and simple capability to mount the probe onto an assembly with the fastener positioned at a consistent distance from the probe optics. Also shown are the connectors for the laser generation fiber beam 305 and laser detection fiber beam 306, and optical components the turning prism 309 and dichromic beam combiner 307. Probe optics are further detailed below.

Figure 4:
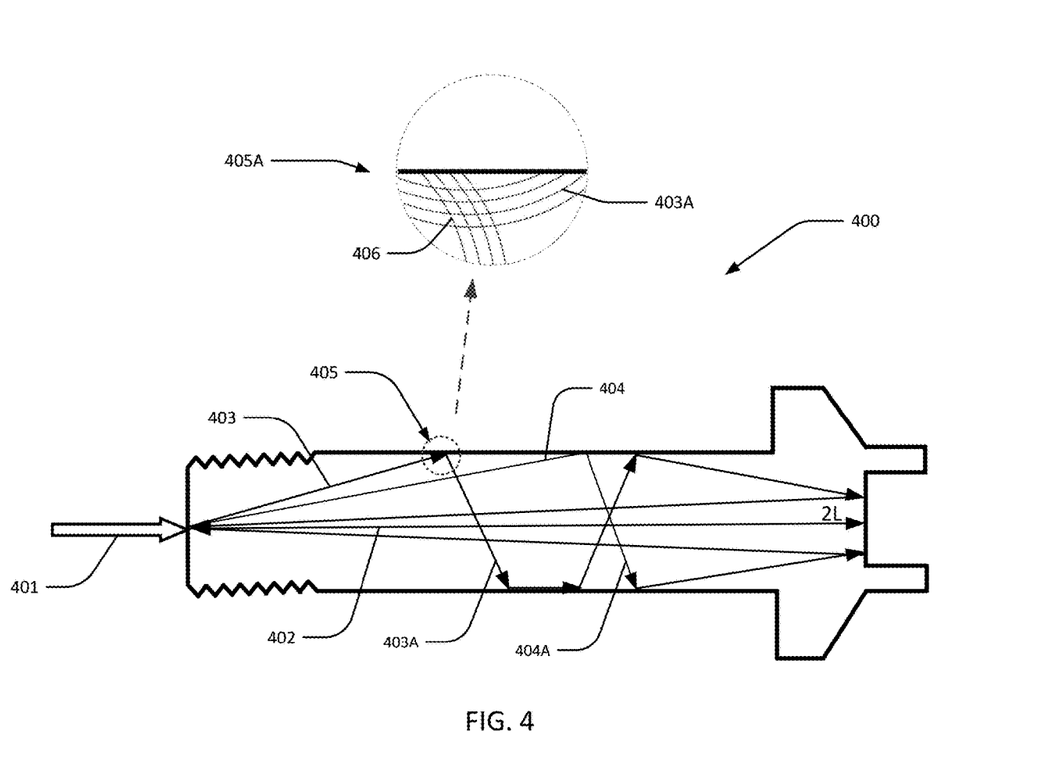
FIG. 4 shows a side cross section view of a fastener superimposed with exemplar trajectories of laser ablation generated ultrasonic signal trajectories.

FIG. 4 shows exemplar ultrasonic wave trajectories within a fastener 400. Ultrasonic waves emanate and return to the focal point for the laser ultrasonic generation and detection beams 401. Conventional transducer generated ultrasonic waves (and one trajectory of waves produced by the laser ultrasonic probe) have a predicable trajectory 402 which is twice the length of the fastener, here identified as "2L" which stands for 2 longitudinal wave segments. An exemplar trajectory consisting a longitudinal wave incident on the fastener wall 403 showing mode conversion to a shear wave 403A. Shown as an exploded view of the wave mode conversion point 405 in 405A are a depiction of the longitudinal wave 403 and shear wave 403A following the mode conversion. A second example generated wave is shown before 404 and after 404A mode conversion. As shown the waves are incident on the walls at a finite angle. This means that the shear wave transit time values are not exactly the same, so the intervals between successive peaks in the signals may not be exactly equal. Various alternative mechanisms describing the propagation of the ultrasonic signals traversing the fastener are applicable to embodiments of the method and probe disclosed herein.

Figure 5:
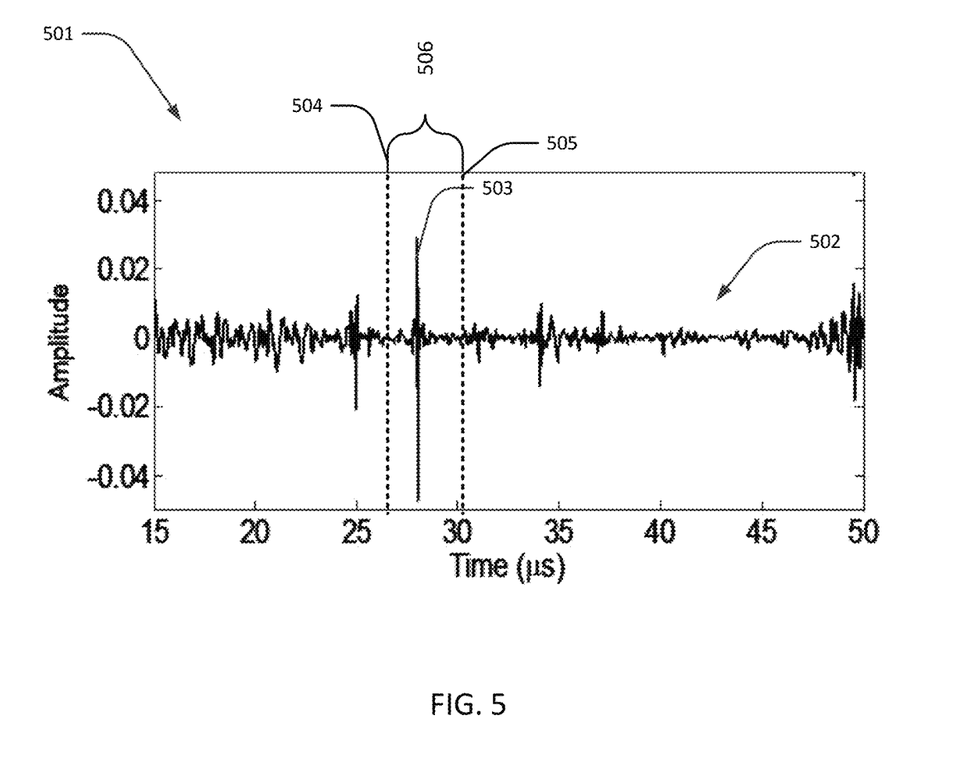
FIG. 5 shows the output from the laser detector signal showing the peak reflected signal detected.

FIG. 5 shows a graph 501 of an exemplar temporal signal 502 for an arrival reference or loaded signal with the peak detected reflected wave signal peak identified 503. Shown is an exemplar arrival window 506 which in various embodiments is determined either manually or automatically by the selection of boundaries 504 and 505.

Figure 6:
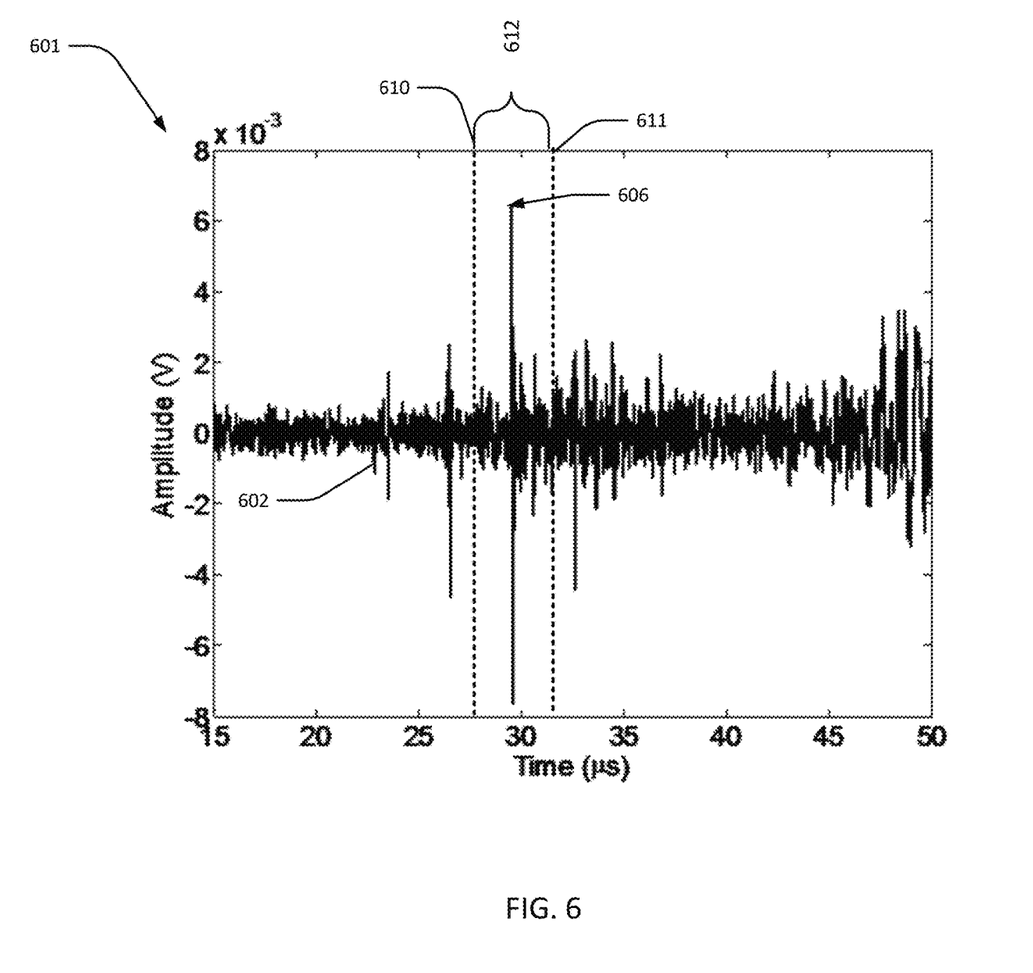
FIG. 6 shows the output from the laser detector signal showing various peaks of the reflected signal detected and an exemplar arrival signal selection window.

FIG. 6 shows a more detailed graph 601 of an exemplar temporal signal detected by the laser ultrasonic probe. Shown is an exemplar arrival window 612 which in various embodiments is determined either manually or automatically by the selection of boundaries 610 and 611. For this exemplar signal, the actual signal trajectories were calculated for various signal peaks including the conventional 2L detection 602. Signal peak 606 represents the largest peak which for this embodiment was the most convenient to use as a reference peak within the chosen arrival window. As can be seen from the exemplar detected signals in FIG. 6, the 2L signal 602 is difficult if not impossible to distinguish from signal noise. Solutions which rely upon the reflection of the simple 2L signal for determination of the length change thus suffer from the problems of incorrect signal identification and ineffective signal detection.

Probe optics for various embodiments, explained in more detail below are identified in FIG. 7. The optical probe has two functions:

Optical: (1) each beam is delivered to the probe by its own fiber 702 and 703, (2) deliver the generation and detection beams in a coaxial, overlapped configuration to the center of the end surface 710 and (3) focus both beams at the designed standoff position and with the design spot diameter values.

Mechanical: incorporate adapters at the output end of the probe that accommodate fasteners with specific diameter and threaded pitch values, with all adapters positioning the end face at the desired standoff position.

Figure 7:
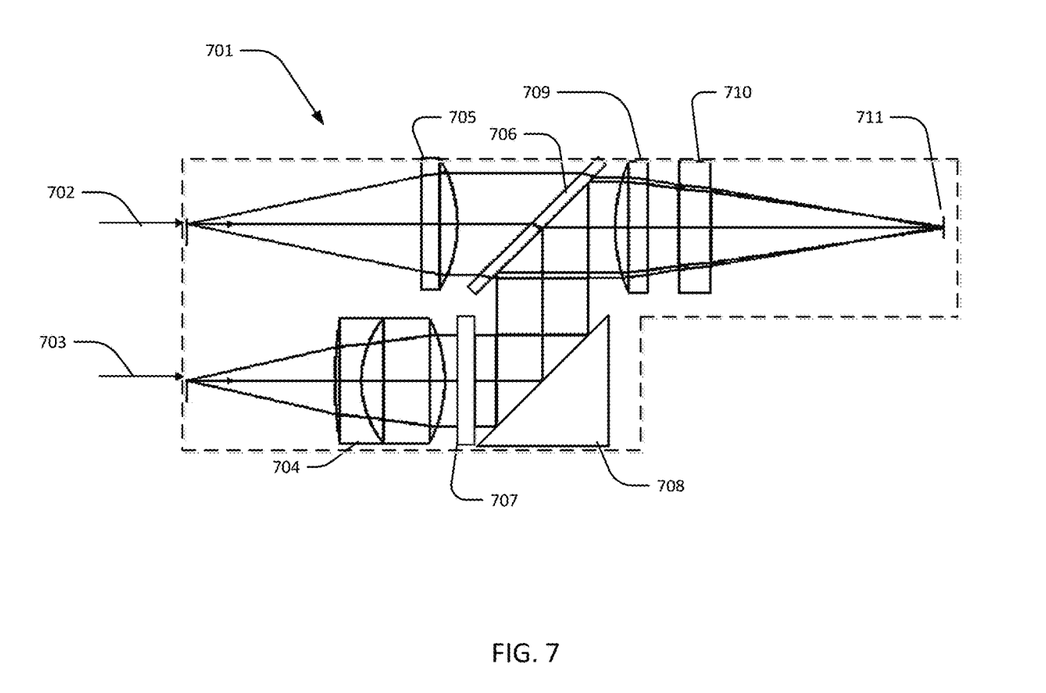
FIG. 7 shows an optics diagram for an exemplar embodiment of the laser probe.

As shown in FIG. 7, the probe 701 incorporates several optical elements:

A lens to collimate each input beam including the generating collimating lens 705 and the detection collimating lens 704;

A filter to block light from the generation laser from traveling into the detection path also called the blocking filter 707;

A turning prism 708 to turn the detection beam by 90 degrees;

A dichroic element to combine the detection and generation beams 706;

An objective lens 709 that focuses the two beams at a specified standoff distance and to specified spot diameters 711;

An easily replaceable output window 710 that protects the internal optics from dust.

In various embodiments, the laser ultrasonic fastener load measurement probe and system are utilized for fasteners in applications with one or both ends of the fastener exposed for attachment of the probe. In alternative embodiments the probe utilizes a connection interface to the fastener which may be affixed by threading the probe to the fastener. In alternative embodiments the probe utilizes a connection interface to the fastener which may be affixed by snapping the probe onto the fastener. In alternative embodiments the probe utilizes a connection interface to the fastener which may be affixed by mounting the probe onto to specially designed wrench used for loading the fastener.

In various embodiments, the laser ultrasonic fastener load measurement probe and system are utilized for fasteners in aerospace vehicle assembly, automotive assembly, critical building structural assembly, among other applications.

The routines and/or instructions that may be executed by the one or more processing units to implement embodiments of the invention, whether implemented as part of an operating system or a specific application, component, program, object, module, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicants' general inventive concept.

What is claimed is:

1. A method for measuring a fastener load comprising:
generating and directing a first laser ultrasonic generation beam to a first end of a fastener prior to loading the fastener;
generating and directing a first laser ultrasonic detection beam to the first end of the fastener prior to loading the fastener;
acquiring by an optical sensor a reference ultrasonic signal prior to loading the fastener;
loading the fastener;
generating and directing a second laser ultrasonic generation beam to the first end of the fastener after loading the fastener;
generating and directing a second laser ultrasonic detection beam to the first end of the fastener after loading the fastener;
acquiring by the optical sensor a loaded ultrasonic signal after loading the fastener;
determining a time difference between a reference peak identified in the reference ultrasonic signal and a corresponding loaded peak identified in the loaded ultrasonic signal, wherein the reference peak identified in the reference ultrasonic signal and the corresponding loaded peak identified in the loaded ultrasonic signal are each acquired at a time later than a calculated expected time for an arrival of a single directly reflected signal from an opposite end of the fastener; calculating a measured fastener load based at least in part on the time difference.

2. The method of claim 1 wherein the reference peak identified in the reference ultrasonic signal and the corresponding loaded peak identified in the loaded ultrasonic signal each have measured a greater signal strength than a simple reflection peak corresponding to the single directly reflected signal from the opposite end of the fastener.

3. The method of claim 1 wherein the reference peak identified in the reference ultrasonic signal and the corresponding loaded peak identified in the loaded ultrasonic signal are the result of a mixture of longitudinal and shear waves which reflect from at least one side wall and once from the opposite end of the fastener prior to returning to a detection location on the first end of the fastener.

4. The method as in claim 1 wherein the first laser ultrasonic generation beam, the first laser ultrasonic detection beam, the second laser ultrasonic generation beam and the second laser ultrasonic detection beam are each directed by a probe attached to the fastener.

5. The method as in claim 1 wherein at least the first laser ultrasonic generation beam is directed to a central portion of the first end of the fastener.

6. The method as in claim 1 wherein the corresponding loaded peak is time-shifted from the reference peak.

7. The method as in claim 1 wherein the probe is attachable to a threaded end of the fastener.

8. The method as in claim 1 wherein the probe is attachable to a threaded end of the fastener by threading the probe onto the threaded end of the fastener.

9. The method as in claim 1 wherein the probe attachable to a rotationally torqued structure portion of the fastener, wherein the rotationally torqued structure may be rotationally fixed to the fastener or threaded onto the fastener.

10. The method as in claim 1 wherein the first laser ultrasonic generation beam and the first laser ultrasonic detection beam are combined using a dichroic optical element, and wherein the second laser ultrasonic generation beam and the second laser ultrasonic detection beam are combined using the dichroic optical element.

11. The method as in claim 1 wherein the first laser ultrasonic generation beam, the first laser ultrasonic detection beam, the second laser ultrasonic generation beam and the second laser ultrasonic detection beam each impinge on overlapping areas of the fastener.

12. A system for measuring a fastener load comprising:
a generating laser component, wherein the generating laser component is configured to generate by a laser, a reference ultrasonic signal in a fastener prior to loading the fastener, and is also configured to generate a loaded ultrasonic signal in the fastener after loading the fastener;
a detecting laser component and an optical sensor, wherein the detection laser component is configured in combination with the optical sensor to acquire the detected reference ultrasonic signal at a first end of the fastener prior to loading the fastener and wherein the detection laser component is configured in combination with the optical sensor to acquire the loaded ultrasonic signal at the first end of fastener after loading the fastener;
a probe configured to direct laser beams from the generating laser component and the detecting laser component onto the first end of fastener;

wherein a peak identified in the reference ultrasonic signal and a corresponding loaded peak identified in the loaded ultrasonic signal are each acquired at a time later than a calculated expected time for an arrival of a single directly reflected signal from an opposite end of the fastener;
wherein a measured fastener load is determined at least in part on the time difference between the peak identified in the reference ultrasonic signal and the corresponding loaded peak identified in the loaded signal.

13. The system of claim 12 wherein the peak identified in the reference ultrasonic signal and the corresponding loaded peak identified in the loaded ultrasonic signal each have a measured signal strength greater than a signal strength of the peak corresponding to the single reflection from the opposite end of the fastener.

14. The system of claim 12 wherein the peak identified in the reference ultrasonic signal and a corresponding loaded peak identified in the loaded ultrasonic signal are the result of a mixture of longitudinal and shear waves which reflect from at least one side wall and once from an opposite end of the fastener.

15. The system of claim 12 wherein the probe is attachable to a threaded end of the fastener.

16. The system of claim 12 wherein the probe is attachable to a rotationally torqued structure portion of the fastener, wherein the rotationally torqued structure may be rotationally fixed or threaded onto the fastener.

17. The system of claim 12 also comprising a dichroic optical element.

18. A probe for measuring a fastener load comprising:
a first input receptacle for a generating laser component configured to generate a reference ultrasonic signal in the fastener prior to loading the fastener, and wherein the generating laser component is configured to generate a loaded ultrasonic signal in the fastener after loading the fastener;
a second input receptacle for a detecting laser component and an optical sensor configured to acquire the reference ultrasonic signal in the fastener prior to loading the fastener and also configured to acquire the loaded ultrasonic signal in the fastener after loading the fastener;
optics which direct laser beams from the generating laser component and the detecting laser component to overlap onto a first end of the fastener;
wherein a reference peak identified in the reference ultrasonic signal and a corresponding loaded peak identified in the loaded ultrasonic signal are each acquired at a time later than a calculated expected time for an arrival of a single directly reflected signal from an opposite end of the fastener;
wherein the measured fastener load is determined at least in part on a time difference between the peak identified in the unloaded reference signal and the corresponding peak identified in the loaded ultrasonic signal.

19. The probe of claim 18 wherein the reference peak identified in the reference ultrasonic signal and the corresponding loaded peak identified in the loaded ultrasonic signal each have a greater measured signal strength than a simple reflection peak corresponding to the single directly reflected signal from the opposite end of the fastener.

20. The probe of claim 18 wherein the peak identified in the unloaded reference signal and a corresponding peak identified in the loaded ultrasonic signal are the result of a mixture of longitudinal and shear waves which reflect several times from at least one side wall and once from an opposite end of the fastener prior to returning to a detection location on the first end of the fastener.

21. The probe of claim 18 wherein the probe is attachable to a threaded end of the fastener.

* * * * *